United States Patent [19]

Weichbrodt et al.

[11] 3,712,130
[45] Jan. 23, 1973

[54] DETECTION OF DISTRIBUTED DEFECTS IN GEAR ASSEMBLIES

[75] Inventors: Bjorn Weichbrodt; Bernard Darrel, both of Schenectady, N.Y.

[73] Assignee: General Electric Company, Schenectady, N.Y.

[22] Filed: Oct. 30, 1970

[21] Appl. No.: 85,331

[52] U.S. Cl. ................................. 73/162, 33/179.5
[51] Int. Cl. ........................................... G01m 13/02
[58] Field of Search ..................... 73/162; 33/179.5

[56] References Cited

UNITED STATES PATENTS 3,530,712   9/1970   Matteucci ........................ 73/162

FOREIGN PATENTS OR APPLICATIONS 945,777   1/1964   Great Britain ........................ 73/162

Primary Examiner—Louis J. Capozi
Assistant Examiner—Denis E. Corr
Attorney—Frank, Paul A., John F. Ahern, Julius J. Zaskalicky, Frank L. Neuhauser, Oscar B. Waddell and Joseph B. Forman

[57] ABSTRACT

A distributed defect in one of a pair of meshing gears produces a modulation in amplitude of the component of the vibration signal which has the same repetition rate as the meshing frequency of the gears. The modulation has a frequency corresponding to the period of rotation of the gear with the distributed effect or a submultiple thereof. Detection of the modulation provides an indication of the existence, character and extent of the defect.

5 Claims, 6 Drawing Figures

PATENTED JAN 23 1973 3,712,130

INVENTORS
BJORN WEICHBRODT
BERNARD DARREL
BY
THEIR ATTORNEY

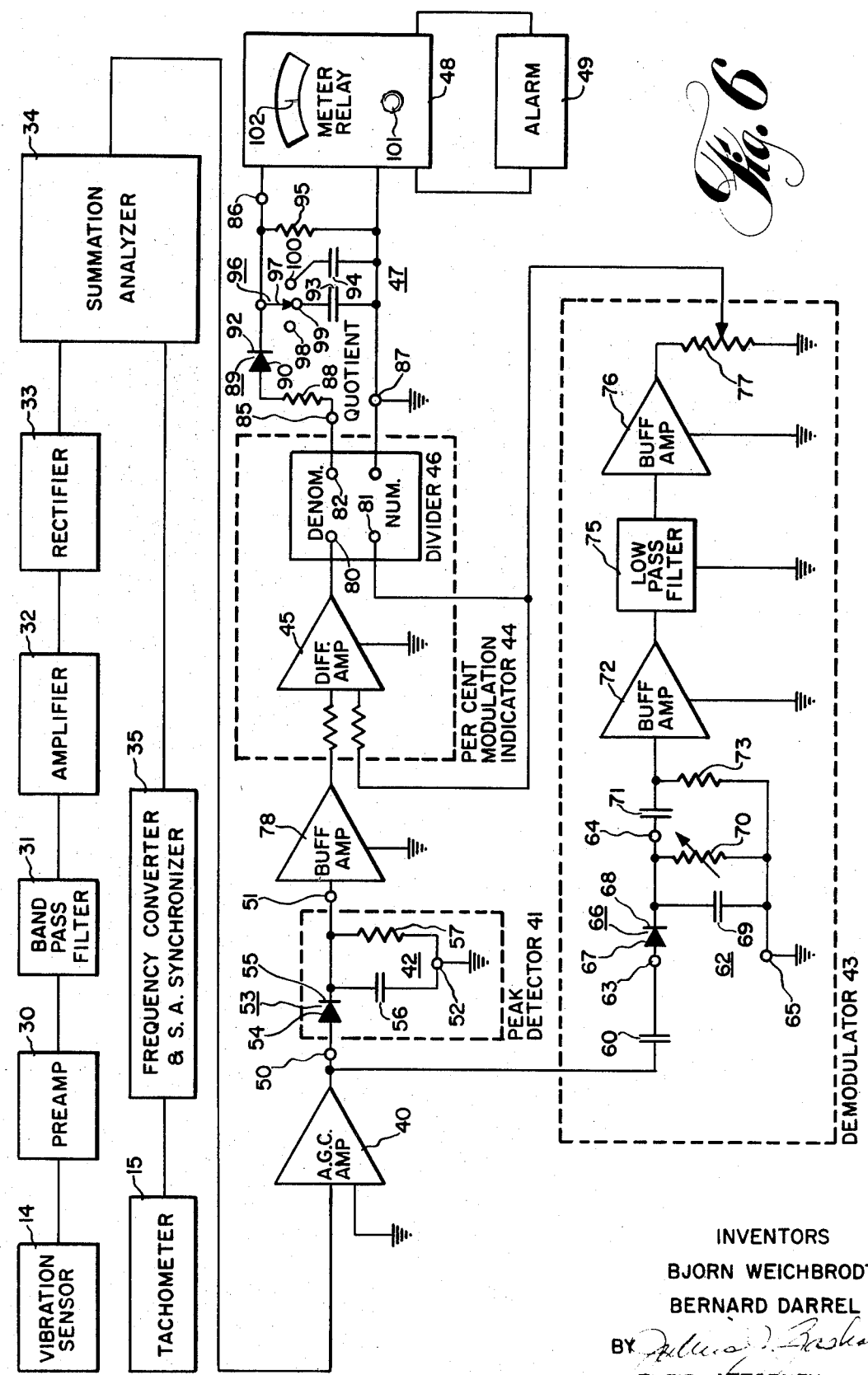

DETECTION OF DISTRIBUTED DEFECTS IN GEAR ASSEMBLIES

The present invention relates to a method and apparatus for the early detection of distributed defects in the gear elements of a gear assembly.

Gear transmissions such as used in jet engines and helicopters are generally very complex and contain a large number of gears. Because of their high speed and light weight design such transmissions often fail rapidly when a defect has started to develop. Defects may be local in character, and for example, may include cracks in the gear teeth, fatigue pitting or scoring of the teeth, and may also be distributed in character and such defects may include misalignment of gear elements, eccentricity of gear elements, excessive wear of bearing support for gear elements, and uneven wear of the gears. It is of prime importance to detect such defects early without interrupting the normal operation of the gear transmission. Conventional techniques for monitoring the condition of the gear transmission include the monitoring of oil pressure and contamination, and temperature of the bearing elements of the gears, measurement of the overall vibrational level and measurement of the transmission's performance parameters such as ratio of input to output torque. A problem with these conventional techniques is that they usually detect the defect too late, that is, after a failure has occurred.

In a copending patent application Ser. No. 23252, filed March 27, 1970, and assigned to the assignee of the present invention, there is disclosed and claimed a system for a determination of incipient failure by the detection of defects local in character. The present invention is directed to a system for the determination of incipient failure in gear transmissions by the detection of defects distributed in character.

Accordingly, an object of the present invention is to provide means for processing of vibration signals derived externally from the assembly of gears to provide information about the existence, character and extent of distributed gear defects.

Another object of the present invention is to provide vibration processing means which can be easily automated to provide automatic monitoring of gear assemblies for the detection of incipient failure of gears.

In carrying out the present invention as applied to the detection of a distributed defect in a gear in a pair of engaging gears, vibrations of the gear assembly are sensed and converted into an electrical signal during the operation of the gears. Means are provided for deriving from the electrical signal a second signal having a period equal to the period of meshing of the gears. The defect produces a modulation in amplitude of the second signal. The period of the modulation is equal to or is a submultiple of the period of rotation of the one gear and the amplitude of the modulation corresponds to the extent of the defect. Means are also provided for demodulating the second signal and deriving a third signal corresponding to the modulation of the second signal. Accordingly, the existence of the third signal indicates the existence of a distributed defect. The frequency or period of the third signal indicates its character and the amplitude thereof indicates its extent.

The novel features which are believed to be characteristic of the present invention are set forth in the appended claims. The invention itself together with further objects and advantages thereof may best be understood by reference to the following description taken in connection with the accompanying drawings wherein:

FIG. 6 is a block diagram partially in schematic form showing apparatus for sensing and processing the vibrations from the gear transmission of FIG. 1 for obtaining an indication of the existence of a distributed defect in any of a pair of engaging gears in the transmission.

Figure 1:
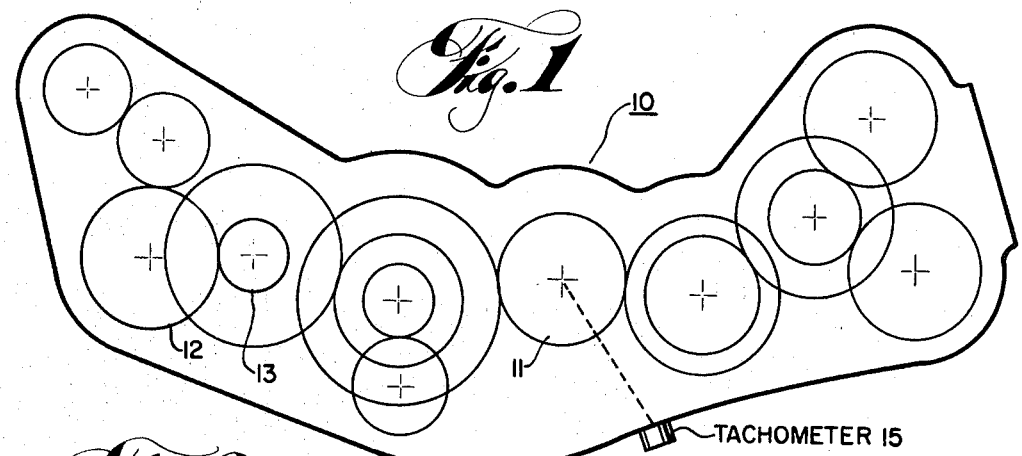
FIG. 1 is a schematic diagram in section of a typical transmission for a jet engine showing a plurality of meshing gears.

Reference is now made to FIG. 1 which shows a gear transmission 10 such as used in a jet engine. Each of the circular outlines shown within the transmission housing represents a gear. Concentric circles represent gears that form a common assembly and rotate together. The regions of contact of the circles indicate regions of engagement of the teeth of the gears. The gear 11 represents the driver gear powered from the engine. The other gears provide the transmission of power to various components of the jet engine, such as hydraulic pump, scavenging pump, lubrication pump, fuel pump, etc. The vibrations produced by the transmission are complex and include many frequencies some of which are quite close to one another. The gear 12 for the lubrication pump and the driving idler gear 13 are specifically designated as they will be specifically referred to in explaining the invention. A sensor 14 which may be an accelerometer is connected to the transmission housing for sensing the vibrations generated therein and converting them into an electrical signal. A tachometer 15 is also mechanically coupled to drive gear 11 to provide a speed reference signal to be utilized in the apparatus of the invention in a manner to be described below.

Figure 2:
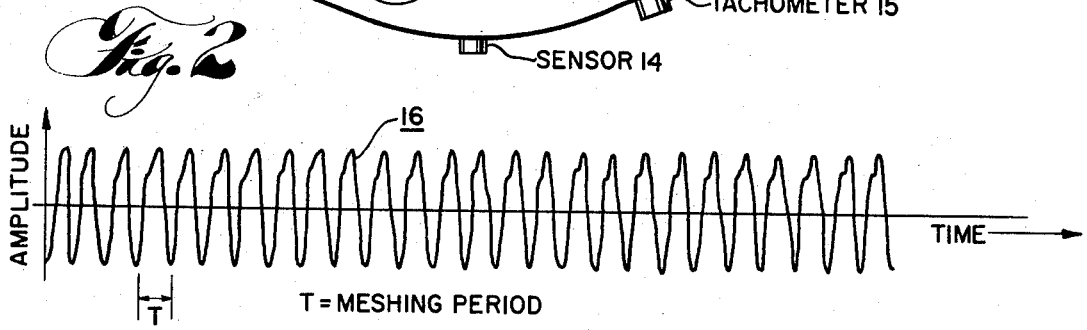
FIG. 2 is a graph showing a typical vibration signal of a pair of gears of FIG. 1 in meshing or engaging relationship which are free of distributed defects.

Prior to a description of the method and apparatus for the detection of distributed gear defects, the effect of a distributed gear defect on the vibrational signal produced by that pair of gears will be described and thereafter the particular method and apparatus for deriving the signals for the detection of the gear defect will be described. Reference is now made to FIG. 2 which shows the characteristic vibration signal 16 produced by the meshing action of any one of a pair of gears. For the purpose of illustration, the lubrication pump gear 12 and the idler gear 13 of the jet engine transmission are selected. With these gears properly operated under constant speed and load, they generate a vibrational signal which is periodic with the frequency of meshing of the teeth thereof, that is all of the meshing events are similar. Accordingly, the vibrational signal generated by such a pair of good gears will have two major characteristics. The signal will be periodic with the meshing frequency and for all meshing periods or cycles it will have the same characteristic waveform. The two characteristics are illustrated in the graph 16 of FIG. 2 which is a graph of a plurality of successive cycles of the characteristic meshing cycle waveform showing the amplitude thereof as a function of time. The repetition rate, which is the reciprocal of the meshing period T, is simple to calculate once the geometry of the gears and the speeds of the gears are known. The characteristic waveform of a meshing cycle depends on the gear profile, the load being transmitted, the speed of the gear and the transmission path between the gear and the sensor which senses the vibrations. The graph of FIG. 2 represents successive cycles of the clean characteristic waveform of a meshing cycle free of background noise and other signals from other gears. The manner in which characteristic vibration signal may be separated from the total vibration signal will be described below in connection with FIG. 6.

Figure 5:
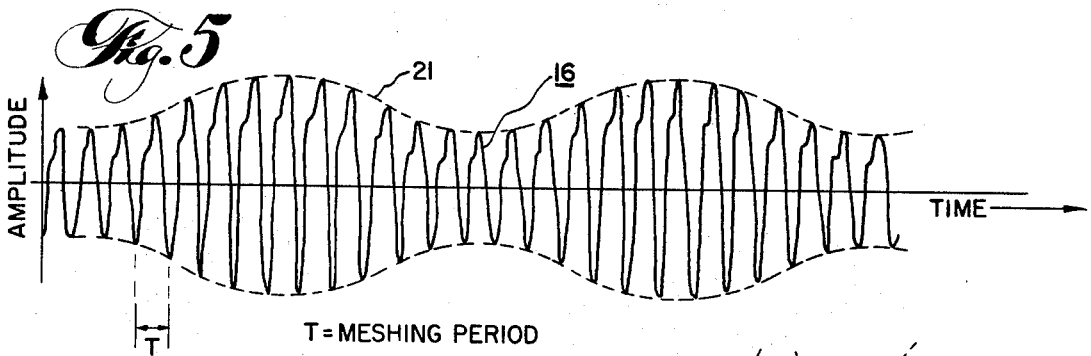
FIG. 5 is a graph of the vibration signal of the pair of gears shown in FIG. 3 showing the modulation of the envelope thereof as a result of the distributed defect.
Figure 3:
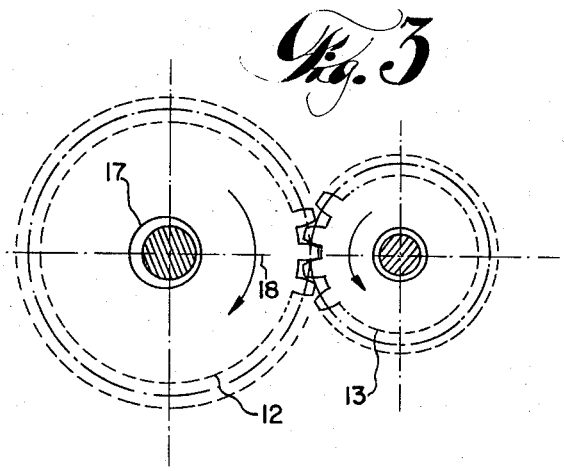
FIG. 3 is a sectional view of a pair of gears of the transmission of FIG. 1 in meshing relationship, one of which shows a distributed defect in the form of an excessively worn support bearing which causes the gear to rotate eccentrically.
Figure 4:
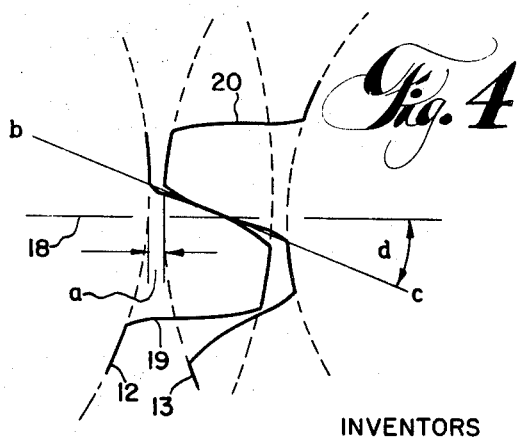
FIG. 4 is a sectional view of a pair of meshing teeth, one from each of the gears of FIG. 3 illustrating the manner in which a cycle of engagement thereof produces vibrations which result in a modulation of the vibration signal of the gears.

Reference is now made to FIG. 3 which shows the lubrication pump gear 12 and idler gear 13. The lubrication pump gear 12 has a defect which displaces the gear 12 somewhat from its center such as when the support bearing 17 in the gear wheel center is excessively worn. As the two gears 12 and 13 rotate and mesh the eccentricity of gear 12 will cause an oscillating variation of the distance between the two gear centers, that is the teeth of the gear 12 will move closer to the teeth of the gear 13 during one half of one revolution of gear 12, then move away from the teeth of the gear 13 during the other half of one revolution of gear 12. This effect causes an oscillation of the distance a shown in FIG. 4 along the center line 18 of the gears 12 and 13. The peak-to-peak amplitude of the oscillation of the distance a is equal to twice the eccentricity of gear 12 and the frequency of oscillation is equal to the rotational frequency of gear 12. Eccentricity of gear 12 is defined as the distance between the geometric center of the gear wheel periphery and the center of the support bearing periphery. This oscillation will cause changes in the dynamic forces operating on the gears for the following reasons. The two meshing teeth 19 and 20 are sliding against each other along a line $b-c$ which forms an angle d with the line 18 connecting the centers of the two shafts of gears 12 and 13. Every time the distance a changes the angle $d$ will cause a change in the relative rotational position of the two gears. Thus, if gear 13 rotates with a constant velocity and the distance a oscillates caused by the eccentricity of of gear 12, then gear 12 will be driven not only with a constant rotational velocity but also with an additional oscillating rotational velocity. This latter oscillation causes the gear meshing forces to also vary in magnitude as the gears rotate. Such variation in magnitude of the meshing forces has the same frequency as the rotational frequency of eccentric gear 12. Since the gear meshing forces are the prime generators of gear vibrational signature or signal with its cycles of characteristic waveforms, this signature or signal is also going to be modulated. Accordingly, the vibrational signal of the gear 12 which normally should have looked as shown in graph 16 of FIG. 2 will instead have a modulation 21 of the envelope thereof such as shown in FIG. 5. For other types of distributed gear effects, the modulation pattern may be different and look more complex. For example, in the case of a gear in which the teeth are worn so as to produce a generally elliptical gear wheel periphery, the modulation envelope of the characteristic vibration signal would have a period which is one-half the period of rotation of the gear. Similarly, on worn gears with a triangular or square periphery, the modulation envelope would have a period which is one third or one fourth, respectively, of the period of rotation of the gear. In gears in which several types of wear occur the modulation envelope would of course be complex in character and would include components of vibration contributed by the various types of wear present.

Reference is now made to FIG. 6 which shows apparatus for sensing vibrations in the gear transmission of FIG. 1 and providing an indication of a distributed defect in any one of the gears. The apparatus includes the vibration sensor 14 of FIG. 1 which may be an accelerometer and develops an electrical signal corresponding to the mechanical vibrations of the gear transmission 10 and also includes a preamplifier 30 which amplifies the signal from the accelerometer, a bandpass filter 31 which eliminates extraneous background vibrations or noise signals, an amplifier 32 for the filtered signal, a rectifier 33, and a summation analyzer 34 to which the rectified signal is applied. The rectification of the amplified signal serves to avoid signal cancellation in summation analyzers which otherwise might happen if consecutive signal elements summed are not exactly identically positioned in time. Rectification is not always needed for further analysis. The apparatus further includes the tachometer 15 of FIG. 1 mechanically coupled to the drive shaft of gear 11, a frequency converter and summation analyzer synchronizer 35 which converts the signal from the tachometer 15 to a trigger signal of a frequency having the same periodicity as the periodicity of the gear 12 being monitored. The triggered signal is applied to the summation analyzer 34 to synchronize the operation thereof.

The summation analyzer is an apparatus such as signal analyzer type 5480B made by Hewlett Packard Company of Santa Clara, Calif., which sums a plurality of signal sampling cycles, each cycle including a plurality of samples, and which provides an averaged output of one cycle of the summed samples. The summation analyzer is provided with an input terminal to which the signal to be analyzed is applied and a synchronizing terminal to which synchronizing or trigger pulses from synchronizer 35 are applied to initiate the sampling cycles. Once initiated the summation analyzer takes a predetermined number of samples in sequence and stores the signal level of each sample in its memory. When it is again triggered by a subsequent trigger pulse, the sampling cycle is repeated and each sample of the cycle is added to a respective sample of the preceding cycle or cycles. After a predetermined number of cycles have been executed and averaged the summation analyzer is automatically operated in the display or readout mode in which the averaged sum of the cycles of signal samples are supplied to the output terminal of the apparatus for display or further signal processing, as desired. The number of samples taken per cycle can be set as desired and the duration of the cycle of samples may also be set as desired to match the cyclical phenomena under study. The output from the summation analyzer 34 is applied to the input of the automatic gain control amplifier 40.

The apparatus also includes a peak detection circuit 41 including a time constant network 42 for detecting peak values of the applied signal, a demodulator 43 for demodulating the envelope of the characteristic vibration signal of a gear, a percent modulation indicator 44 which in response to a peak signal and the envelope modulation signal from the demodulator 43 provides an output which represents the percent modulation of the envelope of the characteristic vibration signal. The percent modulation indicator 44 includes a difference amplifier 45 and a divider 46. The output of the percent modulation indicator 44 is applied to a long time constant circuit 47 for minimizing the effect of transient noise on the operation of the apparatus. A meter relay device 48 is provided which is responsive to a predetermined level of signal from the long time constant circuit 47 for actuation of a suitable indicator, such as an alarm 49.

The automatic gain control amplifier 40 is a conventional automatic gain control amplifier. The gain of the amplifier 40 preferably is controlled by the peaks of the electrical signal occuring therein to maintain a predetermined level of output and to avoid clipping of large amplitude peaks in the electrical signal. If desired, the gain of the amplifier 40 could be controlled in response to a mean or average value of the amplitude of the electrical signal. The peak detection circuit 41 includes an input terminal 50, an output terminal 51 and a common input-output terminal 52 connected to ground. The peak detection circuit also includes a unilaterally conducting device or rectifier 53 having an anode 54 and a cathode 55. The anode 54 is connected to the input terminal 50, the cathode 55 is connected to the output terminal 51. A capacitor 56 and resistor 57 forming time constant network 42 are connected in parallel between the output terminals 51 and 52. Alternating voltage from the amplifier 40 applied to the input terminals of the peak detection circuit 41 is rectified and peak voltage appears across the output terminals thereof. The peak voltage appearing across the output terminals 51 and 52 decays in amplitude in accordance with the time constant of the network 42. The time constant of the network 42 is selected so as to substantially retain the voltage developed thereacross during the interval between peaks in the cycles of characteristic vibration signal of meshing periodicity of the gear being monitored.

The output of the amplifier 40 is also applied through a coupling capacitor 60 to the envelope detection circuit 62 for demodulating the envelope of the characteristic vibration signal of the gear being monitored. The envelope detector circuit 62 includes an input terminal 63, an output terminal 64, and a common input-output terminal 65 which is connected to ground. The detection circuit 62 also includes a unilaterally conducting device 66 having an anode 67 and a cathode 68. The anode 67 is connected to the input terminal 63, the cathode 68 is connected to the output terminal 64. A capacitor 69 and a variable resistor 70 are connected in parallel across the output terminals of the envelope detector 62. The peak voltage appearing across the output terminals of the envelope detector 62 decays amplitude in accordance with the time constant of the network consisting of capacitor 69 and resistor 70. The time constant is set by variable resistor 70 so as to substantially retain the envelope voltage developed thereacross during the interval between peaks in the electrical signal produced by the meshing action of the gear under study. Accordingly, the output essentially is of the form of the modulation envelope of the characteristic vibration signal of the gear under study. To remove high frequency components of signal remaining in the signal at the output of the envelope detector a low pass filter 75 is provided. The output from the envelope detector 62 is coupled through a coupling capacitor 71 to buffer amplifier 72. An input resistor 73 is connected between the input of the buffer amplifier and ground. The output of the buffer amplifier 72 is applied to the input of the low pass filter 75. The output of the low pass filter 75, in turn, is applied through another buffer amplifier 76 to a potentiometer 77.

The output of the potentiometer 77 is applied to one input terminal of the difference amplifier 45. The output of the peak detector 41 is applied through buffer amplifier 78 to another input terminal of the difference amplifier 45. The difference amplifier 45 provides an output which is a difference of the signals applied to the inputs thereof. Accordingly, at the output of the difference amplifier 45 appears a signal which represents the average amplitude of the characteristic vibration signal. The output of the difference amplifier is applied to the denominator terminal 80 of divider 46. To the numerator 81 of the divider is applied the demodulated signal from demodulator 43. Accordingly, at the quotient terminal 82 of the divider is obtained a signal which represents or corresponds to the percent modulation of the characteristic vibration signal of the gear being monitored. For proper operation of the divider 46 it is essential that the gain from the output of the amplifier 40 through the peak detection channel to the numerator terminal thereof and the gain from the output of the amplifier 40 through demodulator channel to the denominator terminal thereof is the same. To this end the potentiometer 77 is provided. In the calibration of the system for operation, the potentiometer 72 is set to assure that the gain through the channels is the same. The divider 46 may be any of a number of dividers, for example, such as analog divider series 450 made by Transmagnetics of Flushing, N.Y.

The long time constant circuit 47 includes an input terminal 85, an output terminal 86 and a common input and output terminal 87 connected to ground. The long time constant circuit also includes a series current limiting resistor 88, a unilaterally conducting device 89 having an anode 90 and a cathode 91, a time constant network 92 including capacitors 93 and 94 of different capacitances, resistor 95 and a switch 96 including an arm 97 and three contacts 98, 99 and 100. The anode 89 of the rectifier is connected through resistor 88 to the input terminal 85 and the cathode 92 is connected to the output terminal 86. The arm 97 of the switch is connected to the cathode 92. The capacitor 93 is connected between the contact 99 and terminal 87 and capacitor 94 is connected between the contact 100 and terminal 87. The resistor 95 is connected between the output terminals 86 and 87. The time constant of the output circuit of the long time constant circuit 47 may be controlled by setting of the arm 97 of the switch to connect the appropriate capacitor 93 or 94 in shunt with the resistor 95. The time constant of the circuit is selected so that it is relatively large in relation to the meshing period of the gear under investigation. Accordingly, the time constant circuit 47 has minimal effect on the output of the divider 46 when the output signal from the sensor includes periodic signals of the meshing period and after the output of the divider 46 has charged the circuit 47. However, the time constant circuit 47 has an averaging effect on the output of the divider in response to signals occurring in the signal processing channels resulting from stray or random causes and having periodicity much greater than the period of a revolution of the gear under investigation. The output from the time constant circuit 47 is applied to a meter relay 48. The meter relay may be any of a variety of such devices commonly available, for example, the noncontacting meter relay made by the Instrument Department of General Electric Company located at Lynn, Mass., which are responsive to a given level of input for actuation for a pair of contacts. Closure of such contacts are utilized to actuate an alarm 49 connected thereto to provide an indication that a particular level of input has been applied to the meter relay. The knob 101 of the meter relay sets a pointer 102 on the face of the meter relay to a desired level. When the input signal causes the pointer 102 of the relay to be aligned or exceed that level, the contacts of the relay are closed without loading the input circuit of the meter relay to effect operation of external apparatus such as the alarm.

While the invention has been described in specific embodiments it will be appreciated that modifications may be made by those skilled in the art and we intend by the appended claims to cover all such modifications as fall within the true spirit and scope of the invention.

What we claim as new and desire to secure by Letters Patent of the United States is:

1. A system for detecting a distributed defect in one gear of a pair of meshing rotating gears comprising
   a vibration sensor coupled to the pair of gears for sensing vibrations thereof and converting said vibrations into an electrical signal,
   means, including a bandpass filter coupled to said vibration sensor, for deriving from said electrical signal a second amplitude modulated signal having a period equal to the meshing period of said gears and a modulation envelope with a period having an integral relation to the period of rotation of said one gear,
   means for demodulating said second signal and producing a third signal indicative of the magnitude of amplitude modulation, and
   output means responsive to said third signal for indicating a distributed gear defect.

2. A system according to claim 1 wherein said means for deriving said second modulated signal includes signal enhancement means for enhancing the portion of said electrical signal passed by said bandpass filter.

3. A system according to claim 1 wherein said means for demodulating said second signal and producing said third signal comprises a peak detector circuit, a demodulator circuit, and a difference circuit for comparing the outputs of said peak detector and demodulator circuits to thereby produce said third signal.

4. A system according to claim 1 wherein said means for deriving said second modulated signal includes signal enhancement means for enhancing the portion of said electrical signal passed by said bandpass filter, and
   said means for demodulating said second signal and producing said third signal comprises a peak detector circuit, a demodulator circuit, a difference circuit for subtracting the outputs of said peak detector and demodulator circuits, and a divider circuit for dividing the outputs of said demodulator and difference circuits to thereby produce said third signal corresponding to the percentage of modulation.

5. A system according to claim 1 wherein said output means is responsive to a predetermined percentage modulation of said third signal.

* * * * *